United States Patent [19]

Orban et al.

[11] Patent Number: 4,699,939
[45] Date of Patent: Oct. 13, 1987

[54] ORTHO CYCLOHEXYL, PARA HYDROXY ARALKANOIC ACID ESTERS AND AMIDE ANTIOXIDANTS

[75] Inventors: Ivan Orban, Basel; Hans-Rudolf Meier, Marly; Paul Dubs, Marly; Samuel Evans, Marly; Peter Hofmann, Basel, all of Switzerland

[73] Assignee: Ciba-Geigy Corporation, Ardsley, N.Y.

[21] Appl. No.: 916,575

[22] Filed: Oct. 8, 1986

[30] Foreign Application Priority Data

Oct. 11, 1985 [CH] Switzerland ............... 4399/85

[51] Int. Cl.$^4$ .................. C07C 69/94; C07C 69/616; C08K 5/13
[52] U.S. Cl. .................. 524/291; 252/48.6; 252/51.5 R; 252/57; 524/239; 524/240; 524/289; 524/194; 560/59
[58] Field of Search ............ 524/291, 194, 222, 99, 524/102, 103, 109, 111, 239, 240, 289; 560/64, 75, 59; 564/150, 153, 154, 158, 170, 177; 546/190; 549/473, 493, 500, 501

[56] References Cited

U.S. PATENT DOCUMENTS

| | | | |
|---|---|---|---|
| 3,029,276 | 4/1962 | Hausweiler et al. | 560/59 |
| 3,282,939 | 11/1966 | Spivack et al. | 564/170 |
| 3,285,855 | 11/1966 | Dexter et al. | 560/75 |
| 3,584,047 | 6/1971 | Dexter et al. | 564/153 |
| 3,594,448 | 7/1971 | Birenzuige et al. | 560/59 |
| 3,660,438 | 5/1972 | Dexter | 524/150 |
| 3,810,869 | 5/1974 | Zaweski | 524/291 |
| 4,034,006 | 7/1977 | Lind et al. | 560/59 |
| 4,049,713 | 9/1977 | Spivack | 564/170 |
| 4,246,198 | 1/1981 | Rosenberger et al. | 564/170 |

FOREIGN PATENT DOCUMENTS

| | | |
|---|---|---|
| 59-25826 | 2/1984 | Japan . |
| 119695 | 5/1981 | Poland . |
| 1299591 | 12/1972 | United Kingdom . |

*Primary Examiner*—Veronica P. Hoke
*Attorney, Agent, or Firm*—Luther A. R. Hall

[57] ABSTRACT

Compounds of formula I

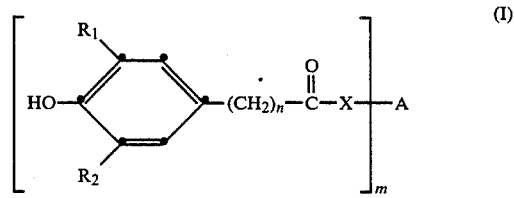

wherein $R_1$, $R_2$ and A are essentially hydrocarbyl or substituted hydrocarbyl groups with at least one of $R_1$ and $R_2$ being cyclohexyl, n is 0, 1 or 2, m is an integer of 1 to 4 and X is oxygen or —$N(R_3)$— wherein $R_3$ is hydrogen, $C_1$–$C_4$ alkyl or phenyl.

16 Claims, No Drawings

ORTHO CYCLOHEXYL, PARA HYDROXY ARALKANOIC ACID ESTERS AND AMIDE ANTIOXIDANTS

The present invention relates to novel 3-cycloalkyl-4-hydroxyphenyl derivatives, to the use thereof and to the organic material stabilised with the aid of said derivatives against thermooxidative and/or light-induced degradation.

The use of sterically hindered phenols for stabilising organic material has long been known. For example, a three-component stabiliser mixture containing as one component a p-hydroxyphenyl derivative is described in Polish patent specification No. 119 695. Diesters containing two sterically hindered p-hydroxyphenyl groups are described in Japanese patent specification Kokai Sho 59-25 826. Carboxamides containing sterically hindered p-hydroxyphenyl groups are described in British patent specification No. 1 299 591.

It has now been found that very specific carboxylates and carboxamides containing a 3-cycloalkyl-4-hydroxyphenyl group can be used with particular advantage as stabilisers.

The present invention relates to compounds of the general formula I

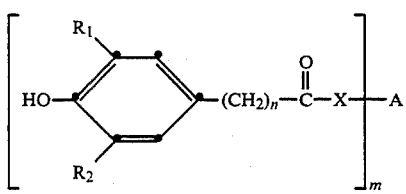

wherein each of $R_1$ and $R_2$ independently of the other is $C_5$–$C_7$cycloalkyl which is unsubstituted or substituted by $C_1$–$C_3$alkyl, and $R_2$ is also $C_1$–$C_{12}$alkyl, phenyl, or $C_7$–$C_{10}$phenylalkyl which is unsubstituted or substituted at the phenyl ring by —OH and/or —OCH$_3$ and/or $C_1$–$C_{12}$alkyl, X is oxygen or —N($R_3$)—, $R_3$ is hydrogen, $C_1$–$C_4$alkyl or phenyl, n is 0, 1 or 2, m is an integer from 1 to 4, and, if m is 1, A is $C_8$–$C_{20}$alkyl, if m is 2, A is $C_2$–$C_{18}$alkylene or $C_2$–$C_{18}$alkylene which is interrupted by —O—, —S—, —(R$_3$)— or —NH—COCO—NH—, or, if X is —N(R$_3$) —, A is additionally a direct bond or a group of formula II, III or IV

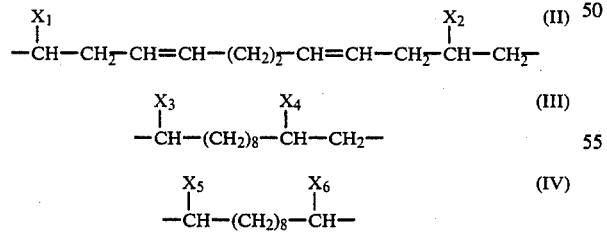

in which formulae $X_1$ is $C_1$–$C_{12}$alkyl, cyclohexyl, phenyl, benzyl or tetrahydrofuryl, $X_2$ and $X_4$ are $C_1$–$C_{12}$alkyl, $X_3$ is $C_1$–$C_{12}$alkyl, cyclohexyl, phenyl, phenyl which is substituted by $C_1$–$C_4$alkyl and/or —OH, or is piperidyl or tetrahydrofuryl, and each of $X_5$ and $X_6$ independently of the other is $C_1$–$C_{12}$alkyl, cyclohexyl, benzyl, phenyl, phenyl which is substituted by $C_1$–$C_4$alkyl and/or —OH, or is naphthyl, if m is 3, A is a trivalent aliphatic hydrocarbon radical containing 3 to 7 carbon atoms, and, if m is 4, A is a tetravalent aliphatic hydrocarbon radical containing 4 to 10 carbon atoms.

$R_1$ and $R_2$ as $C_5$–$C_7$cycloalkyl which is unsubstituted or substituted by $C_1$–$C_3$alkyl are for example cyclopentyl, cyclohexyl, cycloheptyl or α-methylcyclohexyl.

$R_2$, $X_1$, $X_2$, $X_3$, $X_4$, $X_5$ and $X_6$ as $C_1$–$C_{12}$alkyl are e.g. methyl, ethyl, propyl, isopropyl, sec-butyl, tert-butyl, tert-pentyl, hexyl, 2-ethylhexyl, decyl or dodecyl, with alkyl radicals which are branched in the α-position being preferred. $C_1$–$C_5$alkyl, in particular methyl, isopropyl and tert-butyl, is also preferred.

$R_2$ as $C_7$–$C_{10}$phenylalkyl which is unsubstituted or substituted at the phenyl ring by —OH and/or —OCH$_3$ and/or $C_1$–$C_{12}$alkyl is for example benzyl, 2-phenylethyl, 1-phenylethyl, 1-methyl-1-phenylethyl, 3,5-dimethyl-4-hydroxybenzyl, hydroxybenzyl or methoxybenzyl.

$R_3$ is $C_1$–$C_4$alkyl is e.g. methyl, ethyl, propyl or butyl. $R_3$ is preferably hydrogen.

$X_3$, $X_5$ and $X_6$ as phenyl which is substituted by $C_1$–$C_4$alkyl and/or —OH is e.g. 3,5-dimethyl-4-hydroxyphenyl.

If m is 1, then A as straight chain or branched $C_8$–$C_{20}$alkyl is e.g. 2-ethylhexyl, n-octyl, 1,1,3,3-tetramethylbutyl, n-decyl, n-dodecyl, n-hexadecyl or n-octadecyl, with $C_{12}$–$C_{18}$alkyl being preferred and n-octadecyl being particularly preferred.

If m is 2, then A as straight chain or branched $C_2$–$C_{18}$alkylene is e.g. dimethylene, trimethylene, tetramethylene, hexamethylene, 2,2-dimethyltrimethylene, octamethylene, nonamethylene, decamethylene, dodecamethylene or octadecamethylene, with $C_2$–$C_6$alkylene being preferred. If the alkylene group is interrupted by —O—, —S—, —N($R_3$)— or —NH—COCO—NH—, then A is for example 2-thia-1,3-propylene, 3-thia-1,5-pentylene, 4-oxa-1,7-heptamethylene, 3,6-dioxa-1,8-octamethylene, 3,6-diaza-1,8-octamethylene or a —(CH$_2$)$_2$—NHCOCONH—(CH$_2$)$_2$— group. The groups —(CH$_2$)$_2$—S—(CH$_2$)$_2$—, —(CH$_2$)$_2$—O—(CH$_2$)$_2$—O—(CH$_2$)$_2$— and hexamethylene are preferred.

If m is 2, then A as a group of formula II is e.g.

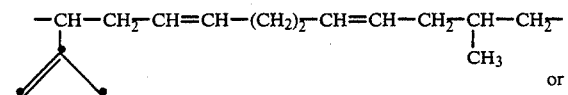

or

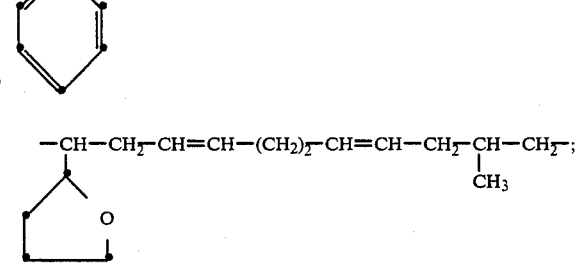

as a group of formula III is e.g.

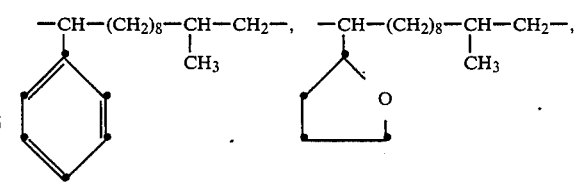

-continued

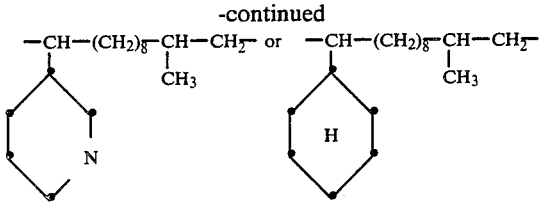

and as a group of formula IV is e.g.

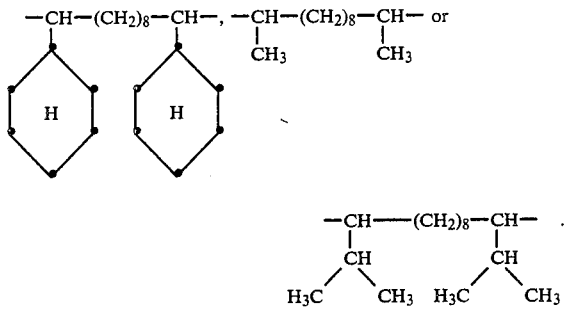

If m is 3, then A as a trivalent aliphatic hydrocarbon radical contaning 3 to 7 carbon atoms is for example $C_3$-$C_7$alkanetriyl, in particular

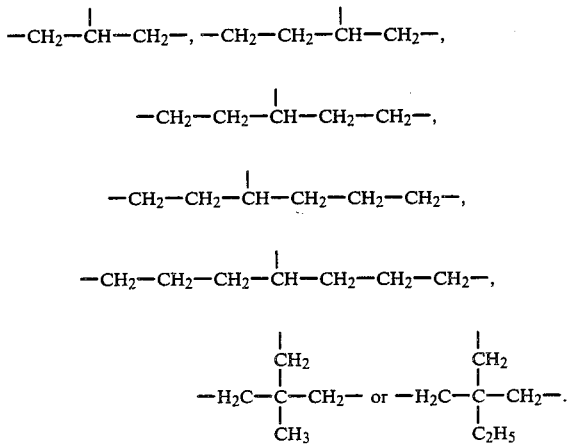

If m is 4, then A as a tetravalent aliphatic hydrocarbon radical containing 4 to 10 carbon atoms is e.g. $C_4$-$C_{10}$alkanetetrayl, in particular pentaerythrityl,

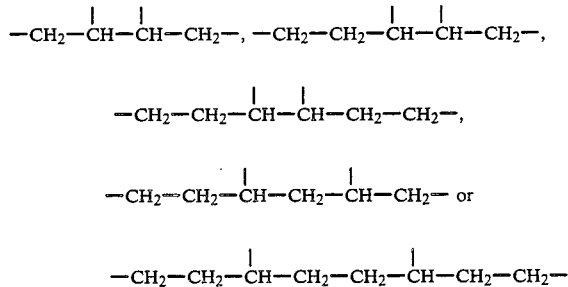

with pentaerythrityl being preferred.

Preferred groups of formula II, III or IV are those wherein $X_1$ is phenyl or tetrahydrofuryl, $X_2$ and $X_4$ are $C_1$-$C_4$alkyl, $X_3$ is $C_1$-$C_4$alkyl, cyclohexyl, phenyl, piperidyl or tetrahydrofuryl and each of $X_5$ and $X_6$ independently of the other is $C_1$-$C_4$alkyl or cyclohexyl.

Particularly preferred compounds of formula I are those wherein, if m is 2, A is $C_2$-$C_{18}$alkylene or $C_2$-$C_{18}$alkylene which is interrupted by —O—, —S—, —N($R_3$)— or —NH—COCO—NH—, or, if X is —N($R_3$)—, A is additionally a direct bond.

Interesting compounds of formula I are those wherein each of $R_1$ and $R_2$ independently of the other is $C_5$-$C_7$cycloalkyl which is unsubstituted or substituted by $C_1$-$C_3$alkyl, and, if m is 2, A is $C_2$-$C_{18}$-alkylene or $C_2$-$C_{18}$alkylene which is interrupted by —O—, —S—, —N($R_3$)— or —NH—COCO—NH—, or, if X is —N($R_3$)—, A is additionally a direct bond.

Compounds of formula I which are also interesting are those wherein X is oxygen or —NH—, and, if m is 1, A is $C_{12}$-$C_{18}$alkyl, and, if m is 2, A is $C_2$-$C_6$alkylene or $C_2$-$C_6$alkylene which is interrupted by —O—, —S—, —NH— or —NH—COCO—NH—, or, if X is —NH—, A is a direct bond.

Further preferred compounds of formula I are those wherein X is oxygen or —NH—, and, if m is 2, A is 2,2-dimethyltrimethylene —($CH_2$)$_2$—S—($CH_2$)$_2$—, —($CH_2$)$_2$—O—($CH_2$)$_2$—O—($CH_2$)$_2$—, —($CH_2$)$_2$—NH—COCO—NH—($CH_2$)$_2$— or hexamethylene, or, if X is —NH—, A is a direct bond.

Compounds of formula I which are also preferred are those wherein each of $R_1$ and $R_2$ independently of the other is cyclohexyl or α-methylcyclohexyl, and $R_2$ is also $C_1$-$C_5$alkyl or phenyl.

Further preferred compounds of formula I are those wherein $R_1$ is cyclohexyl, and $R_2$ is cyclohexyl, $C_1$-$C_5$alkyl or phenyl, in particular cyclohexyl or methyl.

Particularly interesting compounds of formula I are those wherein, if m is 1, A is $C_{12}$-$C_{18}$alkyl, and, if m is 2, A is $C_2$-$C_6$alkylene.

Further interesting compounds of formula I are those wherein $R_1$ is cyclohexyl, $R_2$ is cyclohexyl or methyl, X is oxygen or —NH—, n is 2 and m is 1, 2 or 4, and, if m is 1, A is octadecyl, if m is 2, A is —($CH_2$)$_2$—S—($CH_2$)$_2$—, —($CH_2$)$_2$—O—($CH_2$)$_2$—O—($CH_2$)$_2$— or hexamethylene, and, if m is 4, A is C($CH_2$—)$_4$.

n is preferably 2. m is preferably 4, in particular 2 and most preferably 1. X is preferably oxygen. A particularly preferred meaning of $R_1$ and $R_2$ is cyclohexyl.

Examples of compounds of formula I are:

n-octadecyl 3-(3,5-dicyclohexyl-4-hydroxyphenyl)propionate 1,6-bis[3-(3,5-dicyclohexyl-4-hydroxyphenyl)propionyloxy]hexane 1,5-bis[3-(3,5-dicyclohexyl-4-hydroxyphenyl)propionyloxy]-3-thiapentane N,N'-bis[3(3,5-dicyclohexyl-4-hydroxyphenyl)propionyl]-1,3-diaminopropane N,N'-bis[3-(3,5-dicyclohexyl-4-hydroxyphenyl)propionyl]-1,6-diaminohexane bis[3-(3,5-dicyclohexyl-4-hydroxyphenyl)propionyl]hydrazine 1,8-bis[3-(3,5-dicyclohexyl-4-hydroxyphenyl)propionyloxy]-3,6-dioxaoctane bis[2-(3-(3,5-dicyclohexyl-4-hydroxyphenyl)propionyloxy)ethylamino]oxalate tetrakis[3-(3,5-dicyclohexyl-4-hydroxyphenyl)propionyloxymethyl]methane n-octadecyl 3-(3-cyclohexyl-4-hydroxy-5-methylphenyl)propionate 1,6-bis[3-(3-cyclohexyl-4-hydroxy-5-methylphenyl)propionyloxy]hexane
1,8-bis[3-(3-cyclohexyl-4-hydroxy-5-methylphenyl)propionyloxy]-3,6-dioxaoctane
1,5-bis[3-(3-cyclohexyl-4-hydroxy-5-methylphenyl)propionyloxy]-3-thiapentane.
n-Octadecyl 3-(3,5-dicyclohexyl-4-hydroxyphenyl)propionate, 1,6-bis[3-(3,5-dicyclohexyl-4-hydroxyphenyl)propionyloxy]hexane and tetrakis[3-(3,5-dicyclohexyl-4-hydroxyphenyl)propionyloxymethyl]methane are particularly preferred.

The compounds of the present invention are suitable for stabilising organic material such as for example 1. Polymers of monoolefins and diolefins, for example polyethylene (which may be crosslinked), polypropylene, polyisobutylene, polybutene-1, polymethylpentene-1, polyisoprene or polybutadiene, as well as polymers of cycloolefins, for instance of cyclopentene or norbornene.

2. Mixtures of the polymers mentioned under (1), for example mixtures of polypropylene with polyisobutylene.

3. Copolymers of monoolefins and diolefins with each other or with other vinyl monomers, e.g. ethylene/propylene, propylene/butene-1, propylene/isobutylene, ethylene/butene-1, propylene/butadiene, isobutylene/isoprene, ethylene/alkyl acrylate, ethylene/alkyl methacrylate, ethylene/vinyl acetate or ethylene/acrylic acid copolymers and their salts (ionomers) and terpolymers of ethylene with propylene and a diene, such as hexadiene, dicyclopentadiene or ethylidene-norbornene.

4. Polystyrene, poly-(p-methylstyrene).

5. Copolymers of styrene or α-methylstyrene with dienes or acrylic derivatives, e.g. styrene/butadiene, styrene/acrylonitrile, styrene/alkyl methacrylate, styrene/maleic anhydride, styrene/acrylonitrile/methyl acrylate; mixtures of high impact strength from styrene copolymers and another polymer, e.g. from a polyacrylate, a diene polymer or an ethylene/propylene/diene terpolymer; and block copolymers of styrene, e.g. styrene/butadiene/styrene, styrene/isoprene/styrene, styrene/ethylene/butylene/styrene or styrene/ethylene/propylene/styrene.

6. Graft copolymers of styrene, e.g. styrene on polybutadiene, styrene and acrylonitrile on polybutadiene, styrene and maleic anhydride on polybutadiene, styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers, as well as mixtures thereof with the copolymers listed under (5), for instance the copolymer mixtures known as ABS-, MBS-, ASA- or AES-polymers.

7. Halogen-containing polymers, e.g. polychloroprene, chlorinated rubbers, chlorinated or sulfochlorinated polyethylene, epichlorohydrine homo- and copolymers, in particular polymers from halogen-containing vinyl compounds, e.g. polyvinyl chloride, polyvinylidene chloride, polyvinyl fluoride, polyvinylidene fluoride, as well as copolymers thereof, e.g. vinyl chloride/vinylidene chloride, vinyl chloride/vinyl acetate or vinylidene chloride/vinyl acetate copolymers.

8. Polymers which are derived from α,β-unsaturated acids and derivatives thereof, e.g. polyacrylates an polymethacrylates, polyacrylamides and polyacrylonitriles.

9. Copolymers from the monomers mentioned under (8) with each other or with other unsaturated monomers, e.g. acrylonitrile/butadiene, acrylonitrile/alkyl acrylate, acrylonitrile/alkoxyalkyl acrylate or acrylonitrile/vinyl halide copolymers or acrylonitrile/alkyl methacrylate/butadiene terpolymers.

10. Polymers which are derived from unsaturated alcohols and amines, or acyl derivatives thereof or acetals thereof, e.g. polyvinyl alcohol, polyvinyl acetate, polyvinyl stearate, polyvinyl benzoate, polyvinyl maleate, polyvinylbutyral, polyallyl phthalate or polyallylmelamine.

11. Homopolymers and copolymers of cyclic ethers, e.g. polyalkylene glycols, polyethylene oxide, polypropylene oxide or copolymers thereof with bis-glycidyl ethers.

12. Polyacetals, e.g. polyoxymethylene and those polyoxymethylenes which contain comonomers such as ethylene oxide.

13. Polyphenylene oxides and sulfides, and mixtures of polyphenylene oxides with polystyrene.

14. Polyurethanes which are derived from polyethers, polyesters or polybutadienes with terminal hydroxyl groups on the one side and aliphatic or aromatic polyisocyanates on the other side, as well as precursors thereof.

15. Polyamides and copolyamides which are derived from diamines and dicarboxylic acids and/or from aminocarboxylic acids or the corresponding lactams, e.g. polyamide 4, polyamide 6, polyamide 6/6, polyamide 6/10, polyamide 11, polyamide 12, poly-2,4,4-trimethylhexamethylene terephthalamide or poly-m-phenylene isophthalamide, as well as block-copolymers thereof with polyethers, e.g. with polyethylene glycol, polypropylene glycol or polytetramethylene glycol.

16. Polyureas, polyimides, polyamide-imides and polybenzimidazoles.

17. Polyesters which are derived from dicarboxylic acids and diols and/or from hydroxycarboxylic acids or the corresponding lactones, e.g. polyethylene terephthalate, polybutylene terephthalate, poly-1,4-dimethylolcyclohexane terephthalate, polyhydroxybenzoates as well as block-polyether-esters derived from polyethers having hydroxyl end groups.

18. Polycarbonates and polyester-carbonates.

19. Polysulfones, polyethersulfones and polyetherketones.

20. Crosslinked polymers which are derived from aldehydes on the one hand and phenols, ureas and melamines on the other hand, e.g. phenol/formaldehyde resins, urea/formaldehyde resins and melamine/formaldehyde resins.

21. Drying and non-drying alkyd resins.

22. Unsaturated polyester resins which are derived from copolyesters of saturated and unsaturated dicarboxylic acids with polyhydric alcohols and vinyl compounds as crosslinking agents, and also halogen-containing modifications thereof of low inflammability.

23. Crosslinkable acrylic resins derived from substituted acrylic esters, e.g. from epoxy-acrylates, urethane-acrylates or polyester-acrylates.

24. Alkyd resins, polyester resins or acrylate resins in admixture with melamine resins, urea resins, polyisocyanates or epoxide resins as crosslinking agents.

25. Crosslinked epoxide resins which are derived from polyepoxides, e.g. from bis-glycidyl ethers or from cycloaliphatic diepoxides.

26. Natural polymers such as cellulose, rubber, gelatine and derivatives thereof which are chemically modified in a polymer-homologous manner, e.g. cellulose acetates, cellulose propionates and cellulose butyrates, or the cellulose ethers, e.g. methylcellulose.

27. Mixtures (polyblends) of polymers as mentioned above, e.g. PP/EPDM, Polyamide 6/EPDM or ABS, PVC/EVA, PVC/ABS, PVC/MBS, PC/ABS, PBTP/ABS.

28. Naturally occurring and synthetic organic materials which are pure monomeric compounds or mixtures of such compounds, for example mineral oils, animal or vegetable fats, oils and waxes, or oils, waxes and fats based on synthetic esters (e.g. phthalates, adipates, phosphates or trimellitates) and also those mixtures of synthetic esters with mineral oils in any weight ratios which are used as spinning formulations, as well as aqueous emulsions of such materials.

29. Aqueous emulsions of natural or synthetic rubber, e.g. natural rubber latex or latices of carboxylated sytrene/butadiene copolymers.

Accordingly, the invention also relates to organic material containing at least one compound of formula I.

Preferred organic materials are synthetic polymers, e.g. polyolefins, polystyrene or copolymers of styrene, with polyolefins being particularly preferred.

In general, the compounds of this invention are added to the organic material to be stabilised in amounts of 0.01 to 10%, preferably 0.01 to 5%, most preferably 0.05 to 0.5%, based on the total weight of the material to be stabilised.

For the stabilisation of organic material it is particularly advantageous to employ the compounds of this invention together with thiosynergists. Thiosynergists are known as secondary antioxidants or peroxide scavengers and belong, inter alia, to the following classes of substances: mercaptanes, thioethers, disulfides, dithiocarbamates and heterocyclic thio compounds. Examples of thiosynergists are the following compounds:

pentaerythritol tetrakis[(β-alkylmercapto)propionate] such as for example pentaerythritol tetrakis[(β-dodecylmercapto)propionate]; pentaerythritol tetrakis(-mercaptoacetate), 1,1,1-trimethylolethane tris(mercaptoacetate), 1,1,1-trimethylolpropane tris(mercaptoacetate), dioleyl 3,3'-thiodipropionate, dilauryl 3,3'-thiodipropionate, ditridecyl 3,3'-thiodipropionte, dimyristyl 3,3'-thiodipropionate, distearyl 3,3'-thiodipropionate, dicyclohexyl 3,3'-thiodipropionate, dicetyl 3,3'-thiodipropionate, dioctyl 3,3'-thiodipropionate, dibenzyl 3,3'-thiodipropionate, laurylmyristyl 3,3'-thiodipropionate, diphenyl 3,3'-thiodipropionate, di-p-methoxyphenyl 3,3'-thiodipropionate, didecyl 3,3'-thiodipropionate, dibenzyl 3,3'-thiodipropionate, diethyl 3,3'-thiodipropionate, lauryl 3-methylmercaptopropionate, lauryl 3-butylmercaptopropionate, lauryl 3-laurylmercaptopropionate, phenyl 3-octylmercaptopropionate, lauryl 3-phenylmercaptopropionate, lauryl 3-benzylmercaptopropionate, lauryl 3-(p-methoxy)phenylmercaptopropionate, lauryl 3-cyclohexylmercaptopropionate, lauryl 3-hydroxymethylmercaptopropionate, myristyl 3-hydroxyethylmercaptopropionate, octyl 3-methoxymethylmercaptopropionate, dilauryl 3-carboxymethylmercaptopropionate, dilauryl 3-carboxypropylmercaptopropionate, dilauryl 4,7-dithiasebacate, dilauryl 4,7,8,11-tetrathiatetradecanedioate, dimyristyl 4,11-dithiatetradecanedioate, lauryl 3-benzylthiazylmercaptopropionate; dialkyl disulfides such as dioctyl disulfide, didodecyl disulfide, dioctadecyldisulfide; dialkyl sulfides such as e.g. didodecyl sulfide, dioctadecyl sulfide; alkylthiopropionic acids and the salts thereof, e.g. 3-laurylmercaptopropionic acid and the calcium salt thereof, or the sulfur-containing compounds disclosed in Japanese published patent applications Sho 47-13 533, Sho 47-24 004, Sho 47-24 541 and Sho 47-24 005.

The compounds of this invention are preferably employed together with the lauryl or stearyl esters of β-thiodipropionic acid or with 3-laurylmercaptopropionic acid or the calcium salt thereof.

Dioctadecyl disulfide is a particularly preferred thiosynergist.

The weight ratio of thiosynergist to stabiliser of this invention may be, for example, in the range form 1:1 to 20:1, preferably from 2:1 to 10:1, most preferably from 3:1 to 7:1.

Accordingly, the invention also relates to organic material containing at least one compound of formula I and a thiosynergist.

The stabilised polymer compositions of the present invention may also contain further customary additives such as for example:

1. Antioxidants
1.1. Alkylated monophenols
2,6-di-tert-butyl4-methylphenol
2-tert-butyl-4,6-dimethylphenol
2,6-di-tert-butyl-4-ethylphenol
2,6-di-tert-butyl-4-n-butylphenol
2,6-di-tert-butyl-4-isobutylphenol
2,6-dicyclopentyl-4-methylphenol
2-(α-methylcyclohexyl)-4,6-dimethylphenol
2,6-dioctadecyl-4-methylphenol
2,4,6-tricyclohexylphenol
2,6-di-tert-butyl-4-methoxymethylphenol
1.2. Alkylated hydroquinones
2,6-di-tert-butyl-4-methoxyphenol
2,5-di-tert-butylhydroquinone
2,5-di-tert-amylhydroquinone
2,6-diphenyl-4-octadecyloxyphenol
1.3. Hydroxylated thiodiphehyl ethers
2,2'-thiobis(6-tert-butyl-4-methylphenol)
2,2'-thiobis(4-octylphenol)
4,4'-thiobis(6-tert-butyl-3-methylphenol)
4,4'-thiobis(6-tert-butyl-2-methylphenol)
1.4. Alkylidenebisphenols
2,2'-methylenebis(6-tert-butyl-4-methylphenol)
2,2'-methylenebis(6-tert-butyl-4-ethylphenol)
2,2'-methylenebis[4-methyl-6-(α-methylcyclohexyl)-phenol]
2,2'-methylenebis(4-methyl-6-cyclohexylphenol)
2,2'-methylenebis(6-nonyl-4-methylphenol)
2,2'-methylenebis(4,6-di-tert-butylphenol)
2,2'-ethylidenebis(4,6-di-tert-butylphenol)
2,2'-ethylidenebis(6-tert-butyl-4-isobutylphenol)
2,2'-methylenebis[6-(α-methylbenzyl)-4-nonylphenol]
2,2'-methylenebis[6-(α,α-dimethylbenzyl)-4-nonylphenol]
4,4'-methylenebis(2,6-di-tert-butylphenol)
4,4'-methylenebis(6-tert-butyl-2-methylphenol)
1,1-bis(5-tert-butyl-4-hydroxy-2-methylphenyl)butane
2,6-bis(3-tert-butyl-5-methyl-2-hydroxybenzyl)-4-methylphenol
1,1,3-tris(5-tert-butyl-4-hydroxy-2-methylphenyl)butane
1,1-bis(5-tert-butyl-4-hydroxy-2-methylphenyl)-3-n-dodecylmercaptobutane
ethylene glycol bis[3,3-bis(3'-tert-butyl-4'-hydroxyphenyl)butyrate]

bis(3-tert-butyl-4-hydroxy-5-methylphenyl)dicyclopentadiene bis[2-(3'-tert-butyl-2'-hydroxy-5'-methylbenzyl)-6-tert-butyl-4-methylphenyl]terephthalate 1.5. Benzyl compounds 1,3,5-tris(3,5-di-tert-butyl-4-hydroxybenzyl)-2,4,6-trimethylbenzene bis(3,5-di-tert-butyl-4-hydroxybenzyl)sulfide isooctyl 3,5-di-tert-butyl-4-hydroxybenzylmercaptoacetate bis(4-tert-butyl-3-hydroxy-2,6-dimethylbenzyl)dithiolterephthalate 1,3,5-tris(3,5-di-tert-butyl-4-hydroxybenzyl)isocyanurate 1,3,5-tris(4-tert-butyl-3-hydroxy-2,6-dimethylbenzyl)isocyanurate dioctadecyl 3,5-di-tert-butyl-4-hydroxybenzylphosphonate calcium salt of monoethyl 3,5-di-tert-butyl-4-hydroxybenzylphosphonate 1.6. Acylaminophenols anilide of 4-hydroxylauric acid anilide of 4-hydroxystearic acid 2,4-bis(octylmercapto)-6-(3,5-di-tert-butyl-4-hydroxyanilino)-s-triazine octyl N-(3,5-di-tert-butyl-4-hydroxyphenyl)carbamate 1.7. Esters of β-(3,5-di-tert-butyl-4-hydroxyphenyl)-propionic acid
with mono- or polyhydric alcohols, e.g. with

| methanol | diethylene glycol |
| octadecanol | triethylene glycol |
| 1,6-hexanediol | pentaerythritol |
| neopentyl glycol | tris(hydroxyethyl) isocyanurate |
| thiodiethylene glycol | bis(hydroxyethyl)oxalic acid diamide |

1.8. Esters of β-(5-tert-butyl-4-hydroxy-3-methylphenyl)propionic acid
with mono- or polyhydric alcohols, e.g. with

| methanol | diethylene glycol |
| octadecanol | triethylene glycol |
| 1,6-hexanediol | pentaerythritol |
| neopentyl glycol | tris(hydroxyethyl) isocyanurate |
| thiodiethylene glycol | bis(hydroxyethyl)oxalic acid diamide |

1.9. Amides of β-(3,5-di-tert-butyl-4-hydroxyphenyl)-propionic acid e.g.

N,N'-bis(3,5-di-tert-butyl-4-hydroxyphenylpropionyl)-hexamethylenediamine

N,N'-bis(3,5-di-tert-butyl-4-hydroxyphenylpropionyl)-trimethylenediamine

N,N'-bis(3,5-di-tert-butyl-4-hydroxyphenylpropionyl)-hydrazine.

2. UV absorbers and light stabilisers 2.1. 2-(2'-Hydroxyphenyl)benzotriazoles, for example the 5'-methyl, 3',5'-di-tert-butyl, 5'-tert-butyl, 5'-(1,1,3,3-tetramethylbutyl), 5-chloro-3',5'-di-tert-butyl, 5-chloro-3'-tert-butyl-5'-methyl, 3'-sec-butyl-5'-tert-butyl, 4'-octoxy, 3',5'-di-tert-amyl and 3',5'-bis(α,α-dimethylbenzyl)derivatives.

2.2. 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example, 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate and hexadecyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of 4-hydroxy-3,5-di-tert-butylbenzylphosphonic acid monoalkyl esters, e.g. of the methyl or ethyl ester, nickel complexes of ketoximes, e.g. of 2-hydroxy-4-methylphenyl undecyl ketoneoxime, nickel complexes of 1-phenyl-4-lauroyl-5-hydroxypyrazole, with or without additional ligands.

2.6. Sterically hindered amines, for example bis(2,2,6,6-tetramethylpiperidyl)sebacate, bis(1,2,2,6,6-pentamethylpiperidyl)sebacate, bis(1,2,2,6,6-pentamethylpiperidyl)n-butyl-3,5-di-tert-butyl-4-hydroxybenzylmalonate, the condensation product of 1-hydroxyethyl-2,2,6,6-tetramethyl-4-hydroxypiperidine and succinic acid, the condensation product of N,N'-(2,2,6,6-tetramethyl-4-piperidyl)hexamethylenediamine and 4-tert-octylamino-2,6-dichloro1,3,5-s-triazine, tris(2,2,6,6-tetramethyl-4-piperidyl)nitrilotriacetate, tetrakis(2,2,6,6-tetramethyl-4-piperidyl)-1,2,3,4-butane tetracarboxylate, 1,1'-(1,2-ethanediyl)bis(3,3,5,5-tetramethylpiperazinone).

2.7. Oxalic acid diamides, for example 4,4'-dioctyloxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butyloxyanilide and mixtures of ortho- and para-methoxy-disubstituted oxanilides and mixtures of o- and p-ethoxy-disubstituted oxanilides.

3. Metal deactivators, for example N,N'-diphenyloxalic acid diamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalic acid dihydrazide.

4. Phosphites and phosphonites, for example triphenyl phosphite, diphenylalkyl phosphites, phenyldialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, tristearyl sorbitol triphosphite, tetrakis(2,4-di-tert-butylphenyl) 4,4'-biphenylene diphosphonite, 3,9-bis(2,4-di-tert-butylphenoxy)-2,4,8,10-tetraoxa-3,9-diphosphaspiro[5.5]undecane.

5. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

6. Polyamide stabilisers, for example copper salts in combination with iodides and/or phosphorus compounds and salts of divalent manganese.

7. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium stearate, sodium ricinoleate and potassium palmitate, antimony pyrocatecholate or tin pyrocatecholate.

8. Nucleating agents, for example 4-tert-butylbenzoic acid, adipic acid, diphenylacetic acid.

9. Fillers and reinforcing agents, for example calcium carbonate, silicates, glass fibres, asbestos, talcum, kaolin, mica, barium sulfate, metal oxides and hydroxides, carbon black, graphite.

10. Other additives, for example plasticisers, lubricants, emulsifiers, pigments, fluorescent whitening agents, flame retardants, antistatic agents, blowing agents.

Incorporation of the stabiliser substances of this invention and further optional additives into the organic material is effected by known methods. It can be effected, for example, by blending the products of this invention and further optional additives by methods conventionally employed in the art, before or during the manufacture of articles shaped from said polymer, or also by applying the dissolved or dispersed compound to the polymer, with or without subsequent evaporation of the polymer. The products of this invention may also be added to the materials to be stabilised in the form of a masterbatch which contains said products, for example, in a concentration of 2.5 to 25% by weight. The products of this invention may be added before or during polymerisation or before crosslinking.

In general, the various customary additives are added to the organic material to be stabilised in amounts of 0.01 to 10%, preferably 0.01 to 5%, based on the total weight of the material to be stabilised.

The materials thus stabilised can be used in a wide range of forms, for example as films, filaments, ribbons, moulding compositions, profiles, or as binders for varnishes, adhesives or putties.

The invention also relates to the use of compounds of formula I for stabilising organic material against thermooxidative and light-induced degradation.

The compounds of formula I can be prepared in a manner known per se, for example as described in published British patent applications Nos. 996 502 and 1 299 591 and U.S. Pat. No. 3,330,859, by reacting a compound of formula V

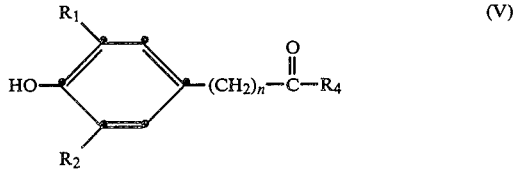

wherein $R_1$, $R_2$ and n are as defined above and $R_4$ is e.g. halogen, —OH or $C_1$-$C_5$alkoxy, preferably —Cl, —OCH$_3$ or —OC$_2$H$_5$, with a corresponding alcohol or amine of formula VI $$[H-X]_{\overline{m}}A \qquad (VI)$$

wherein A, X and m are as defined above, in the presence of a suitable catalyst. Examples of transesterification catalysts are dibutyltin oxide, lithium amide, potassium hydroxide and tetrabutyl titanate.

The transesterification reactions can be carried out in the melt or in a suitable aprotic solvent such as toluene or xylene.

The reaction temperature is, for example, in the range from 100° to 200° C., preferably from 120° to 180° C.

If an acid chloride of formula V is reacted with a corresponding alcohol or amine, then the reaction is conveniently carried out at room temperature in a suitable solvent such as e.g. methylene chloride, toluene or xylene.

The starting products are either known compounds, some of which are commercially available, or they can be prepared by methods analogous to known ones.

If A in formula I is a group of formula II, III or IV, then the corresponding amines can be prepared, for example, as described in published European patent application No. 85 653 and U.S. Pat. Nos. 4,506,099 and 4,100,111.

The phenols required for the preparation of compounds of formula V can be prepared, for example, by a method analogous to that described in U.S. Pat. No. 3,093,587.

The invention is illustrated in more detail by the following Examples.

EXAMPLE 1

(A) Preparation of methyl 3-(3,5-dicyclohexyl-4-hydroxyphenyl)propionate

At room temperature, a 2.5 l stainless steel autoclave is charged, in succession, with 722.4 g of 2,6-dicyclohexylphenol (2.8 mol), 375 g of tert-butanol and 30 g of potassium tert-butylate (0.268 mol). The autoclave is sealed and the contents are then heated, with stirring, to 90° C. At 90° C., 482.3 g of methyl acrylate (5.6 mol) are then added over 10 minutes. The mixture is heated to 133°–135° C. and stirred for a further 18 hours at this temperature. The pressure remains constant and is about 10 bar. The contents of the autoclave are cooled to 80° C., and the potassium tert-butylate is neutralised by the addition of 26 g of glacial acetic acid (0.4 mol). The volatile proportions of the reaction mixture are removed by rotary evaporation at 85° C. and 20 mbar.

The yield of crude product is 1217 g. The crude product contains 800 g of product, 120 g of 2,6-dicyclohexylphenol, 27 g of potassium acetate and also oligomerised methyl acrylate.

The crude product is recrystallised twice in three times the amount of aqueous 99% methanol. The pure product is obtained as a colourless crystal powder and has a melting point of 118° C.

(B) Preparation of octadecyl 3-(3,5-dicyclohexyl-4-hydroxyphenyl)propionate

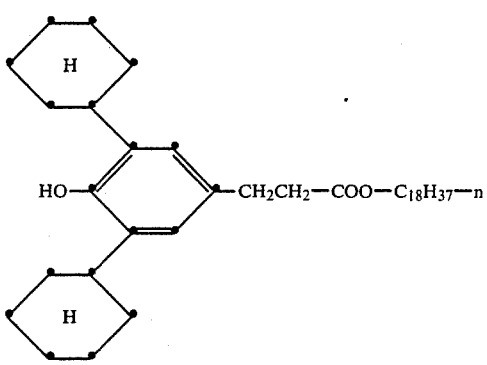

A 750 ml flask equipped with drip funnel and distillation cooler is charged, in succession, with 137.6 of methyl 3-(3,5-dichlorohexyl-4-hydroxyphenyl)propionate (0.4 mol), 110.2 g of octadecanol (0.407 mol), 350 g of toluene and 0.6 g of dibutyltin oxide (0.0024 mol).

The mixture is heated with stirring. When the temperature of the reaction mixture is 113° C., the methanol formed during the reaction begins to distill into the receiver, together with the toluene. The temperature of the reaction mixture increases to 150° C. Distillation is continued at this temperature for 6 hours, the liquid volume in the distillation flask being held constant by the addition of toluene. The reaction solution is clarified and subsequently concentrated by rotary evaporation at 140° C. and 1 mbar.

The yield of crude product is 225 g. The crude product is recrystallised in 800 g of ethanol. The pure product is obtained as a colourless to slightly beige-coloured crystalline powder and has a melting point of 44° C.

Elementary analysis: calculated: C 80.36%; H 11.41%; O 8.23%. found: C 80.30%; H 11.10% O 8.20%.

$^1$H-NMR: ester $CH_2$ signal in $CDCl_3$: $\delta = 4.06$ ppm (triplet; coupling constant J=6.5 Hz). ($\delta$ is based on TMS=0).

EXAMPLE 2

Preparation of 1,6-bis[3-(3,5-dicyclohexyl-4-hydroxyphenyl)propionyloxy]hexane

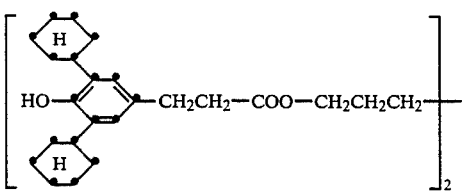

In an apparatus fitted with a distillation head, under nitrogen and at 533 mbar, 9.27 g of methyl 3-(3,5-dicyclohexyl-4-hydroxyphenyl)propionate, 1.53 g of 1,6-hexanediol and 0.05 g of dibutyltin oxide are heated for 20 hours at 130° C. The methanol forming is continuously distilled off. The yield of crude product is 9.7 g. Chromatographic purification (silica gel) affords 5.7 g of a colourless powder which has a melting point of 113°–115° C.

Elementary analysis: calculated: C 77.59%; H 9.50%. found: C 77.43%; H 9.43%.

$^1$H-NMR: ester $CH_2$ signal in $CDCl_3$: $\delta = 4.06$ ppm (triplet; coupling constant J=6.5 Hz). ($\delta$ is based on TMS=0).

EXAMPLE 3

Preparation of 1,8-bis[3,5-dicyclohexyl-4-hydroxyphenyl)propionyloxy]-3,6-dioxaoctane

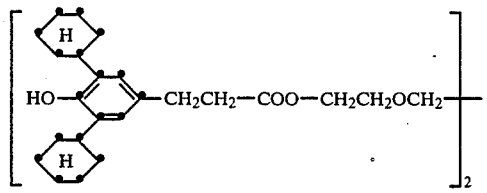

In an apparatus fitted with a distillation head, under nitrogen and at 533 mbar, 53.3 g of methyl 3-(3,5-dicyclohexyl-4-hydroxyphenyl)propionate, 11.6 g of triethylene glycol and 0.2 g of lithium amide are heated for 24 hours at 130° C. The yield of crude product is 59.1 g. Chromatographic purification (silica gel) affords a yellow oil.

Elementary analysis: calculated: C 74.38%; H 9.10%. found: C 74.01%; H 9.16%.

$^1$H-NMR: ester $CH_2$ signal in $CDCl_3$: $\delta = 4.25$ ppm (triplet; coupling constant J=5 Hz). ($\delta$ is based on TMS=0).

EXAMPLE 4

Preparation of tetrakis[3-(3,5-dicyclohexyl-4-hydroxyphenyl)propionyloxymethyl]methane

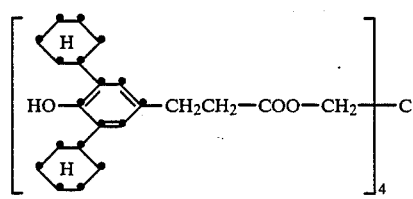

A flask equipped with a dephlegmator which has been heated to 80° C. is charged with 1533 g of methyl 3-(3,5-dicyclohexyl-4-hydroxyphenyl)propionate and 165 g of pentaerythritol, and the contents are heated to 120° C. After the addition of 4.8 g of dibutyltin oxide, the mixture is heated, under nitrogen and at 250 mbar, to 200° C. During heating, the methanol is distilled off into a receiver and the vacuum is improved over 2 hours to 2 mbar. The resultant melt is poured onto a metal tray and, after solidifying, is comminuted. A yellowish granulate with a melting point of 122° C. is obtained. The yield is 1520 g.

Elementary analysis: calculated: C 77.13%; H 9.02%. found: C 77.43%; H 9.10%.

$^1$H-NMR: ester $CH_2$ signal in $CDCl_3$: $\delta = 3.95$ ppm (singlet). ($\delta$ is based on TMS=0).

Mass spectrum (indicated in m/z): 1384 (molecular ion peak).

EXAMPLE 5

Preparation of N,N'-bis[3-(3,5-dicyclohexyl-4-hydroxyphenyl)propionyl]-1,6-diaminohexane

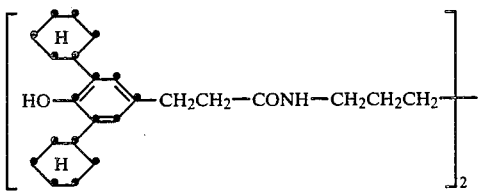

11.6 of 1,6-diaminohexane are heated, under nitrogen, to 175° C. Then 0.2 g of acetic acid are added. Over 1 hour, 68.9 g of methyl 3-(3,5-dicyclohexyl-4-hydroxyphenyl)propionate are added to this mixture. The reaction mixture is heated for a further 3 hours at 175° C. The mixture is stirred, in a mixer, with 100 ml of 1% aqueous sodium bicarbonate. The resultant solid is isolated by suction filtration and washed with water until neutral. After drying, 60.3 g of a colourless powder with a melting point of 28° C. are obtained.

Elementary analysis: calculated: C 77.79%; H 9.79%; N 3.78%; found: C 77.55%; H 9.85%; N 3.76%.

EXAMPLE 6

(A) Preparation of methyl 3-(3-cyclohexyl-4-hydroxy-5-methylphenyl)propionate

A reaction vessel is charged, under nitrogen, with 95.1 g of 2-cyclohexyl-6-methylphenol, 5.6 g of 50% aqueous potassium hydroxide solution and 30 ml of toluene, and the contents are heated to 140° C., with toluene and water being distilled off as azeotropes. The reaction vessel is evacuated to a pressure of 300 mbar, and the reaction mixture is then held for 1 hour at 140° C. at this pressure.

Subsequently at 120° C., 47.4 g of methyl acrylate are added dropwise over 2 hours, and the mixture is then held for 8 hours at 120° C. The cooled solution is taken up in toluene, and the resultant toluenic solution is washed with 10% hydrochloric acid and then with water. Working up affords 129.6 g of crude product. After distillation, a colourless oil with a melting point of 176° C./0.03 mbar is obtained.

Elementary analysis: calculated: C 73.88%; H 8.75%. found: C 73.60%; H 8.68%.

(B) Preparation of octadecyl 3-(3-cyclohexyl-4-hydroxy-5-methylphenyl)propionate

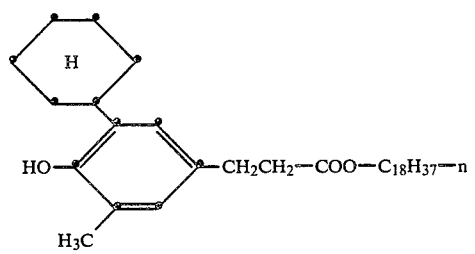

27.6 g of methyl 3-(3-cyclohexyl-4-hydroxy-5-methylphenyl)propionate and 27.1 g of octadecanol are heated, under nitrogen, to 80° C. as described in Example 2. After the addition of 0.1 g of lithium amide, the reaction mixture is heated for 10 hours at 150° C. The methanol forming is continuously distilled off. The yield is 30.2 g of crude product which is in the form of a yellowish oil and can be purified by column chromatography.

Elementary analysis: calculated: C 79.32%; H 11.36%. found: C 79.22%; H 11.26%.

$^1$H-NMR: ester $CH_2$ signal in $CDCl_3$: $\delta = 4.05$ ppm (triplet; coupling constant J=6.5 Hz). ($\delta$ is based on TMS=0).

EXAMPLE 7

Preparation of 1,6-bis[3-(3-cyclohexyl-4-hydroxy-5-methylphenyl)propionyloxy]hexane

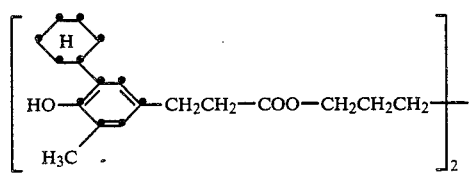

45.54 g of methyl 3-(3-cyclohexyl-4-hydroxy-5-methylphenyl)propionate, 9.69 g of 1,6-hexanediol and 0.2 g of dibutyltin oxide are heated for 24 hours at 140° C. as described in Example 2, during which time the methanol forming distills off. The yield of crude product is 49.1 g. After purification by chromatography, a yellowish oil is obtained.

Elementary analysis: calculated: C 75.21%; H 8.97%. found: C 75.02%; H 9.04%.

$^1$H-NMR: ester $CH_2$ signal in $CDCl_3$: $\delta = 4.06$ ppm (triplet; coupling constant J=7 Hz). ($\delta$ is based on TMS=0).

EXAMPLE 8

Preparation of 1,8-bis[3-(3-cyclohexyl-4-hydroxy-5-methylphenyl)propionyloxy]-3,6-dioxaoctane

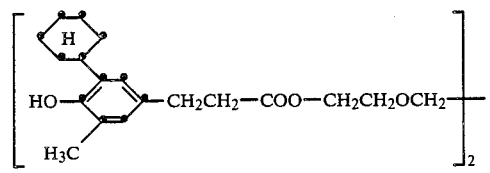

43.26 g of methyl 3-(3-cyclohexyl-4-hydroxy-5-methylphenyl)propionate, 11.7 g of triethylene glycol and 0.2 g of dibutyltin oxide are heated for 24 hours at 150° C. as described in Example 2, during which time the methanol forming distills off. Working up affords a yellowish resin.

Elementary analysis: calculated: C 71.44%; H 8.52%. found: C 71.25%; H 8.52%.

$^1$H-NMR: ester $CH_2$ signal in $CDCl_3$: $\delta = 4.25$ ppm (triplet; coupling constant J=5 Hz). ($\delta$ is based on TMS=0).

EXAMPLE 9

Preparation of
1,5-bis[3-(3,5-dicyclohexyl-4-hydroxyphenyl)propionyloxy]-3-thiapentane

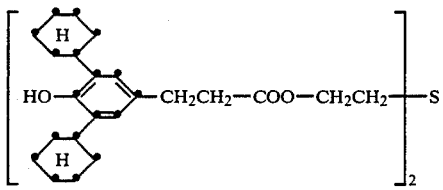

0.2 mol of methyl 3-(3,5-dicyclohexyl-4-hydroxyphenyl)propionate, 0.1 mol of 1,5-dihydroxy-3-thiapentane and 2 ml of tetrabutyl titanate are heated for 8 hours at 150° C. as described in Example 2, during which time the methanol forming distills off. After working up, the yield of product is 25.5% of theory.

$^1$H-NMR: ester CH$_2$ signal in CDCl$_3$: δ=4.21 ppm (triplet; coupling constant J=7 Hz). (δ is based on TMS=0).

Mass spectrum (FD-MS; indicated in m/z): 746 (molecular ion peak).

EXAMPLE 10

Preparation of
1,5-bis[3-(3-cyclohexyl-4-hydroxy-5-methylphenyl)propionyloxy]-3-thiapentane

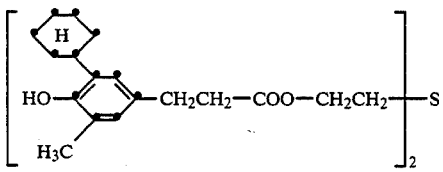

0.1 mol of methyl 3-(3-cyclohexyl-4-hydroxy-5-methylphenyl)propionate, 0.05 mol of 1,5-dihydroxy-3-thiapentane and 0.05 g of dibutyltin oxide are heated for 18 hours at 160° C. as described in Example 2, during which time the methanol forming is distilled off. After working up, the yield of product is 25.1% of theory.

$^1$H-NMR: ester CH$_2$ signal in CDCl$_3$: δ=4.21 ppm (triplet; coupling constant J=7 Hz). (δ is based on TMS=0).

Mass spectrum (indicated in m/z): 610 (molecular ion peak).

In Examples 11–14 the following abbreviations are used:
DSTDP: distearyl 3,3'-thiodipropionate
DLTDP: dilauryl 3,3'-thiodipropionate
DODS: dioctadecyl disulfide
DTPH: 3-dodecylmercaptopropionic acid
DTPCa: calcium salt of 3-dodecylmercaptopropionic acid

EXAMPLE 11

(A) Polypropylene powder (melting index at 230° C. and a test load of 2.16 kp: 2.3 g/10 min) containing 0.1% of calcium stearate is mixed with one of the additives listed in Table Ia below, and the mixture is subsequently kneaded in a Brabender plastograph for 10 minutes at 200° C. The resultant mass is moulded in a press with a surface temperature of 260° C. to plates of 1 mm thickness. Strips 1 cm in width and 8.5 cm in length are punched out of these plates. Several such strips from each plate are hung in a circulating air oven which has been heated to 135° C. or 149° C. The strips are then observed at regular intervals. The onset of a circular yellow discolouration is an indication of the oxidative decomposition of these strips. The amount of time lapsed until decomposition is a measure of the stability of the sample.

TABLE Ia

| Temperature | Stabiliser | Number of days until decomposition |
|---|---|---|
| 135° C. | none | 1 |
|  | 0.3% of DSTDP | 42 |
|  | 0.1% of the comp. of Ex. 1B + 0.3% of DSTDP | 206 |
| 149° C. | none | <1 |
|  | 0.3% of DSTDP | 8 |
|  | 0.1% of the comp. of Ex. 1B + 0.3% of DSTDP | 34 |
|  | 0.1% of the comp. of Ex. 2 + 0.3% of DSTDP | 90 |
|  | 0.1% of the comp. of Ex. 3 + 0.3% of DSTDP | 53 |
|  | 0.1% of the comp. of Ex. 4 + 0.3% of DSTDP | 104 |
|  | 0.1% of the comp. of Ex. 6B + 0.3% of DSTDP | 65 |
|  | 0.1% of the comp. of Ex. 7 + 0.3% of DSTDP | 78 |
|  | 0.1% of the comp. of Ex. 8 + 0.3% of DSTDP | 58 |
|  | 0.1% of the comp. of Ex. 9 + 0.3% of DSTDP | 98 |
|  | 0.1% of the comp. of Ex. 10 + 0.3% of DSTDP | 88 |

(B) The samples prepared in accordance with Example 11A are treated with water for 6 weeks at a temperature of 90° C. and then subjected to the above-described test in the circulating air oven. The results are summarised in Table Ib.

TABLE Ib

| Stabiliser | Temperature | Number of days until decomposition |
|---|---|---|
| 0.1% of the comp. of Ex. 1B + 0.3% of DSTDP | 135° C. | 215 |
|  | 149° C. | 26 |

EXAMPLE 12

(A) The samples prepared in accordance with Example 11A are immersed in distilled water and kept there at 90° C. Each week fresh water is used. The discolouration of the samples is assessed visually after 4, 6 and 12 weeks, with 5 indicating colourless and 1 indicating greatly discoloured. The results are summarised in Table IIa.

TABLE IIa

| Stabiliser | Time in weeks | Discolouration |
|---|---|---|
| 0.1% of the comp. of Ex. 1B + 0.3% of DSTDP | 0 | 5 |
|  | 4 | 5 |
|  | 6 | 5 |

TABLE IIa-continued

| Stabiliser | Time in weeks | Discolouration |
|---|---|---|
| | 12 | 5 |

(B) The samples prepared in accordance with Example 11A are subjected to exposure for 200 hours in an exposure device (Xenotest 150). The result is shown in Table IIb.

TABLE IIb

| Stabiliser | Initial condition | After 200 hours in a Xenotest 150 |
|---|---|---|
| 0.1% of the comp. of Ex. 1B + 0.3% of DSTDP | 5 | 5 |

EXAMPLE 13

The test method described in Example 11A is employed. The results are summarised in Table III.

TABLE III

| | Number of days until decomposition at a temperature of | |
|---|---|---|
| Stabiliser | 149° C. | 135° C. |
| no stabiliser | <1 | 1 |
| 0.35% of DSTDP | 8 | 45 |
| 0.05% of the comp. of Ex. 1B + 0.35% of DSTDP | 34 | 334 |
| 0.35% of DLTDP | 2 | 16 |
| 0.05% of the comp. of Ex. 1B + 0.35% of DLTDP | 24 | 93 |
| 0.35% of DODS | <1 | 1 |
| 0.05% of the comp. of Ex. 1B + 0.35% of DODS | 97 | 310 |

EXAMPLE 14

100 parts of polypropylene powder (melting index at 230° C. and a test load of 2.16 kp: 2.3 g/10 min) containing 0.1% of calcium stearate are homogeneously mixed with one of the additives listed in Table IV. The resultant mixture is extruded 5 times in succession in a single-screw extruder at a maximum of 260° C. or 280° C. (temperature of the discharge zone) and 100 rpm, and then granulated. After the first, third and fifth extrusion, the melting index of the material is determined at 230° C. and a test load of 2.16 kp. The results are summarised in Table IV. An increase in the melting index is an indication of degradation of the material.

TABLE IV

| | Melting index at 230° C. and 2.16 kp in g/10 minutes | | |
|---|---|---|---|
| Stabiliser | 1st extrusion | 3rd extrusion | 5th extrusion |
| (a) Extrusion temperature 200° C./220° C./240° C./260° C. | | | |
| no stabiliser | 10.5 | 22.3 | 36.0 |
| 125 ppm of the comp. of Example 1B + 875 ppm of DTPH | 3.6 | 4.5 | 5.2 |
| 125 ppm of the comp. of Example 1B + 875 ppm of DTPCa | 3.8 | 4.6 | 5.7 |
| 125 ppm of the comp. of Example 1B + 875 ppm of DODS | 4.5 | 5.7 | 6.7 |

TABLE IV-continued

| | Melting index at 230° C. and 2.16 kp in g/10 minutes | | |
|---|---|---|---|
| Stabiliser | 1st extrusion | 3rd extrusion | 5th extrusion |
| (b) Extrusion temperature 260° C./270° C./280° C./280° C. | | | |
| no stabiliser | 15.2 | 142 | |
| 125 ppm of the comp. of Example 1B + 875 ppm of DTPH | 4.3 | 7.5 | 12.1 |
| 125 ppm of the comp. of Example 1B + 875 ppm of DTPCa | 4.5 | 13.7 | 23.6 |
| 125 ppm of the comp. of Example 1B + 875 ppm of DODS | 4.7 | 7.9 | 11.4 |

What is claimed is:

1. A compound of formula I

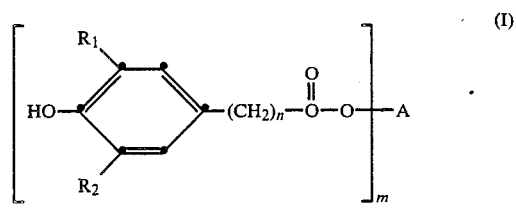

wherein
R₁ is cyclohexyl,
R₂ is cyclohexyl or methyl,
n is 0, 1 or 2,
m is an integer from 1 to 4, and
when m is 1, A is C₈-C₂₀-alkyl,
when m is 2, A is C₂-C₁₈-alkylene or C₂-C₁₈-alkylene which is interrupted by —O—, —S—, —N(R₃)— or —NHCOCONH— where R₃ is hydrogen, C₁-C₄-alkyl or phenyl,
when m is 3, A is a trivalent aliphatic hydrocarbon radical containing 3 to 7 carbon atoms, and
when m is 4, A is a tetravalent aliphatic hydrocarbon radical containing 4 to 10 carbon atoms.

2. A compound according to claim 1, wherein m is 1.
3. A compound according to claim 1 wherein, when m is 1, A is C₁₂-C₁₈-alkyl.
4. A compound according to claim 1, wherein m is 2.
5. A compound according to claim 1, wherein, when m is 2, A is C₂-C₆-alkylene or C₂-C₆-alkylene which is interrupted by —O—, —S—, —NH— or —NHCOCONH—.
6. A compound according to claim 1 wherein, when m is 2, A is 2,2-dimethyltrimethylene, —(CH₂)₂—S—(CH₂)₂—, —(CH₂)₂—O—(CH₂)₂—O—(CH₂)₂—, —(CH₂)₂—NHCOCONH—(CH₂)₂— or hexamethylene.
7. A compound according to claim 1, wherein R₁ and R₂ are cyclohexyl.
8. A compound according to claim 1, wherein, if m is 1, A is C₁₂-C₁₈alkyl, and, if m is 2, A is C₂-C₆alkylene.
9. A compound according to claim 1, wherein m is 4.
10. A compound according to claim 1, wherein n is 2.
11. A compound according to claim 1 wherein n is 2 and m is 1, 2 or 4, and, when m is 1, A is octadecyl; when m is 2, A is —(CH₂)₂—S—(CH₂)₂—, —(CH₂)₂—O—(CH₂)₂—O—(CH₂)₂— or hexamethylene; and when m is 4, A is C(CH₂—)₄.
12. A compound selected from the group consisting of n-octadecyl 3-(3,5-dicyclohexyl-4-hydroxyphenyl)- propionate, 1,6-bis[3-(3,5-dicyclohexyl-4-hydroxyphenyl)propionyloxy]hexane and tetrakis[3-(3,5-dicyclohexyl-4-hydroxyphenyl)propionyloxymethyl]methane according to claim 1.

13. Organic material containing at least one compound of formula I according to claim 1.

14. Organic material according to claim 13 containing as additional component a thiosynergist.

15. Organic material according to claim 13, wherein said organic material is a polyolefin.

16. A method of stabilising organic material against thermooxidative and/or light induced degradation, which method comprises incorporating into the organic material an amount of at least one compound of formula I as defined in claim 1, which amount is sufficient for stabilisation.

* * * * *